Patented July 4, 1944

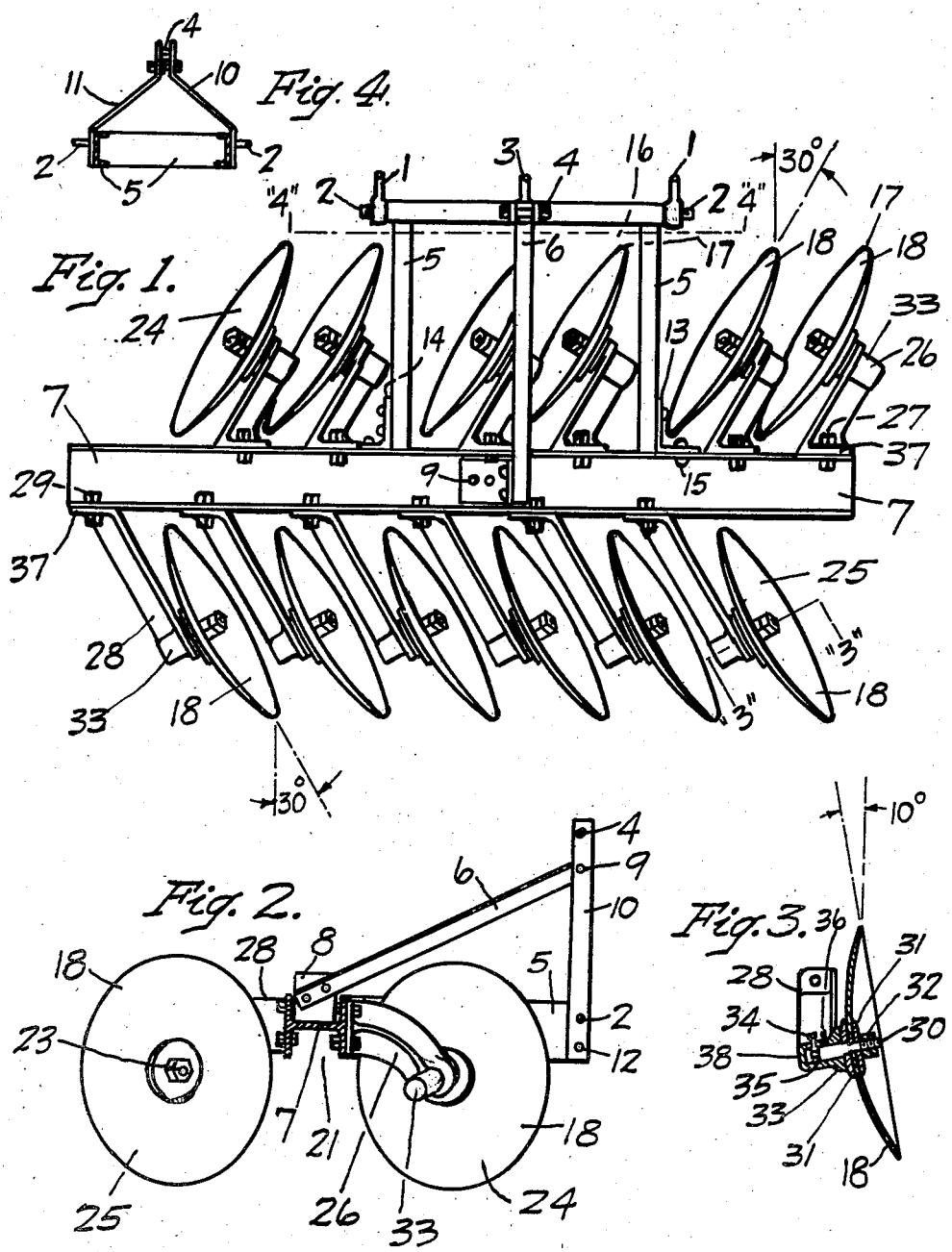

2,352,963

UNITED STATES PATENT OFFICE 2,352,963

DISK HARROW

William Frederick McMahon, Riverside, Calif.

Application July 8, 1940, Serial No. 344,321

4 Claims. (Cl. 55—30)

My invention relates to improvements in disk harrows adapted to be actuated by a hydraulic lift as applied to tractors having hydraulic lifts, and by which, the said hydraulic lift assists in regulating the depth of the penetration of the disk harrow, into or out of the earth.

The objects of my improvement are, first, to provide a double gang disk harrow adapted to be efficiently applied to a tractor having a hydraulic lift; second, to provide a disk harrow comprising two gangs of disks, both said gangs of disks being fixed against lateral or radial movement and secured, at about a thirty degree plowing angle and about a ten degree suction angle, to the same single steel member and opposed to each other; third, to provide an efficient harrowing means as applied to a tractor having a mechanical or hydraulic lift; fourth, to provide a disk harrow which will be supported and carried by the tractor, thereby eliminating the need for wheels or a carriage and wheels to be made part of or directly connected to said disk harrow.

My invention possesses other objects and valuable features, some of which will be set forth in the following description of my invention which is illustrated in the drawing forming part of the specification. It is to be understood that I do not limit myself to the drawing and said specification as further objects and advantages will be made evident hereinafter.

Referring to the drawing, which is for illustrative purposes only:

Fig. 1 is a plan view of the complete disk harrow.

Fig. 2 is an end elevation, showing the single H column frame in section.

Fig. 3 is a sectional elevation through the disk blade and bearing at 3—3 in Fig. 1. Each respective disk blade is arranged thus.

Fig. 4 is a sectional elevation through the connecting frame members at 4—4 in Fig. 1, showing the vertical frame members adapted to connect the compression structural member of the frame.

The tractor parts which are attached to the disk harrow, are tension links 1 which attach to and pull the harrow through pins 2; and compression link 3 which is attached to the harrow by pin 4. This compression link 3 transmits a pushing force against the tractor and/or transmits the reaction forces from the harrow to a device in the tractor which tends to automatically control the depth of the disk harrow into the earth. The mechanical or hydraulic lift device, in the tractor, utilizes links 1 and link 3 to raise or lower the harrow into or out of the earth. Tension links 1 and compression link 3 are only illustrated in part in the drawing as their construction and method of operation is well known in the conventional Ford-Ferguson or similar tractors having hydraulic or mechanical lifts. It should be noted that the conventional hydraulic and mechanical lifts do not force the disk blades into the earth but it is the suction angle or action of the disk blades which sucks or draws the disk harrow into the earth. These conventional Ford-Ferguson lift type tractors, while being well known commercially, their construction may be more definitely defined by reference to the Ferguson Patents 1,900,440 and 2,118,181, further description being thought to be superfluous.

Pins 2 are secured to and fixed with the box-shaped pulling frame 5. Pin 4 is secured to compression member 6, which in this case, is made of angle iron 6. Compression member 6 is connected with the single main frame member 7 by an angle clip 8 by means of rivets 9. Compression member 6 is also supported and connected to the box frame 5 by means of structural members 10 and 11 which are riveted or bolted as at 12 to said frame 5.

The main frame member 7 is made of an H column and said pulling frame 5 is secured thereto by means of angle clips 13 and 14 and rivets 15. The pulling frame 5 extends outward at right angles to said main frame 7 to a point 16 just outside of the edge 17 of the disk blades 18.

H column 7 provides a practical and novel means for securing the disk brackets 26 and 28 thereto. It is also so arranged to be but a short distance 21 above the center 23 of the disk shafts 30. This said distance 21 provides a new low center of gravity for the entire harrow and permits the pulling force on pins 2 to be as close as possible to the center 23 of disk shafts 22. By pulling force on pins 2, I mean the pulling force exerted by the tractor. The H column 7 is also located between the both gangs 24 and 25 of disks 18. The construction of the implement is such that its center of gravity of weight is in close proximity with the tractor. The brackets 26 of the front gang 24 of disks 18 are secured in a fixed position to the H column 7 by rivets or bolts 27. The brackets 28 of the rear gang 25 of disks 18 are likewise secured to the H column 7 by rivets or bolts 29.

By referring to Fig. 1 of the drawing, which is a plan view of the disk harrow looking directly down on said harrow, it will be noted that the disk blades 18 have or make a thirty degree angle with the H column 7. The front gang 24 is parallel to and opposed to the rear gang 25 while each gang has a respective thirty degree angle of cutting angle. When the tractor pulls the harrow, the disks 18 revolve and the front gang 24 cuts into the earth and moves the same to the left, while the rear gang 25 cuts into the earth and moves the same to the right together with a major portion of the earth previously moved to the left by the said front gang 24. This said cultivating action exposes the largest possible proportion of the turned earth to the sunlight. The arrangement of the rear gang 25, by being parallel to and directly opposed to the front gang 24, smooths out the top of the soil moved. A maximum pulverizing soil action is thusly also created by this arrangement of the opposed gangs of disks running parallel to each other, and the disk blades 18, of each gang 24 and 25, having in conjunction therewith, respective and independent opposed thirty degree angles with the center cross member 7 which is parallel with the rear axle of the tractor.

By referring to Fig. 3 of the drawing, it will be seen, that each disk blade 18 has a ten degree so-called suction angle with a vertical line through the center of the disk. This ten degree angle provides a suction action, on each blade, serving to draw the harrow into the earth.

Disk blades 18 are of the conventional heat treated steel type. A 20" or 22" diameter disk blade is preferred. Disk blades 18 are mounted on shafts 30. In other words, each disk blade 18 is mounted on its own respective shaft 30 and is secured thereto by means of washers 31 and nuts 32 which have threaded engagement with the said shaft 30. The disk blade 18 is adapted to be rotated together with its shaft 30, which shaft bears in brackets 26 or 28. The reacting force or pressure acting on the blade 18 during its cutting action, in the earth, tends to keep the blade 18, pressing or bearing in one direction against the bearing 33. While in the opposite longitudinal direction, the shaft 30 is kept from moving out of the bearing 33 by means of set-screw 34 which has threaded engagement with bearing 33 and extends into a groove 35 provided in shaft 30.

A lubricating means 36 is provided in bearing 33 to lubricate the shaft 30 and bearing 33.

It should be noted that each bearing 26 or 28 together with its respective shaft 30, disk 18, nuts 32 and washers 31 comprise an independent unit.

Brackets 26 and 28 are each preferably formed a preferred steel casting comprising of a bracket flange 37 and a bearing 33 adapted to be closed at one end 38 and arranged to receive the shaft 30. Bearing 33 of the brackets 26 and 28 provides the ten degree angle with a vertical line, as shown in Fig. 3 of the drawing. The bracket flange 37 of bracket 26 or 28 provides the thirty degree angle of the said bracket with the H column 7, as shown in Fig. 1 of the drawing. Thus each bracket 26 or 28 is adapted to form a single unit connecting the bearing 33 with the H column 7 and is secured thereto by bolts 27 or 29.

The H column 7, frame member, located between the both gangs of disks, together with the novel setting of fixed and independent disk brackets 26 and 28 thereto, provides an efficient implement for a tractor having a hydraulic lift. This is evident from the fact that the depth of the penetration of this implement can not be regulated efficiently without the use of a hydraulic lift, because of the fixed thirty degree angles of the both opposed gangs of disks. This implement may be instantaneously lifted out of the earth or soil when the tractor is turning around, at least this is a preferred method of operation. Also the connecting links 1 and 3, of the tractor's mechanical or hydraulic lift, are made in lever construction in which, the fulcrum point therefor is located in a mechanism made part of the tractor, while the lever point, opposite the said fulcrum point, is the place where my implement connects to the said links 1 and 3. This means that to insure a minimum load on the hydraulic lift mechanism, the center of weight, of any implement, connected to the said tractor hydraulic lift, should be as close as possible to, the tractor, or in other words, as close as possible to the said fulcrum for the connecting links 1 and 3. Therefore it is noted that the H column 7 as located, between the both gangs 24 and 25 and at a point just above the center of the disk shafts 30, constitutes a requirement in this kind of implement as applied to a tractor having a hydraulic lift. Also the pulling force, exerted by the tractor, acts in a direct line to the H column 7 and creates a compression stress on the front brackets 26 and a tension stress on the rear brackets 28, thus resulting in a minimum of bending stress on either. The compression force, on frame member 6, is distributed at a point between the both gangs 24 and 25.

Having thus set forth the description of my improvement, what I claim is:

1. In cultivating apparatus adapted to be pulled by a tractor and raised or lowered by a hydraulic lift mechanism made part of said tractor, a disk harrow comprising two parallel and fixed opposed gangs of disks, a single central frame member disposed parallel to and between said gangs and below the top of said gangs of disks, both said gangs comprising a plurality of corresponding disks independently secured to said central frame member and extending therefrom forwardly and rearwardly respectively, each disk, of each gang, adapted to be rotated and having a fixed cutting or horizontal pitch angle of the order of thirty degrees more or less to a line at right angle with the central frame member and a fixed suction or vertical angle of the order of ten degrees with the center-line of the disk, a rigid hitch connection for connecting the said central frame member to the tractor and its hydraulic lift mechanism, whereby the weight of the disk harrow is supported by the tractor.

2. In a cultivating implement adapted to be pulled by a tractor and raised or lowered by lift mechanism made part of said tractor, a disk harrow comprising two opposed gangs of disks fixed against lateral and horizontal radial movement, both of said gangs opposed to different hands and extending forwardly and rearwardly respectively, a single frame member horizontally interposed between and parallel with said gangs of disks and vertically interposed in close proximity with the center of said gangs of disks, both said opposed gangs of disks having fixed plowing angles and each gang comprising a plurality of corresponding disks adapted to be rotated, each disk of each gang being independently secured to said single frame member and having a relative fixed plowing or horizontal pitch angle of the order of thirty degrees more or less to a line at right angle with the said single frame member and a fixed suction or vertical angle of the order of ten degrees with the center line of the disk, a rigid hitch connection for connecting the said single frame member to the tractor and its lift mechanism, whereby the weight of the disk harrow is supported by the tractor.

3. In a cultivating implement adapted to be pulled by a tractor and raised or lowered by a lift mechanism made part of said tractor, a disk harrow comprising two gangs of disks forming a forwardly extending gang and a rearwardly extending gang, a central frame member, a series of independent and horizontal outwardly disposed bracket bearings secured to both front and rear longitudinal sides of said central frame member, a disk blade mounted on each said bracket bearing and adapted to be rotated, each front bracket bearing arranged to give a thirty degree more or less plowing angle and a ten degree suction angle to its respective disk blade, each rear bracket bearing being opposed to its respective front bracket bearing and arranged to give a thirty degree more or less plowing angle and a ten degree suction angle to its respective disk blade, said central frame member interposed between both gangs of disks in close proximity with the vertical center of the disk blades, rigid hitch connection for connecting the central frame member to means provided on said tractor, whereby the weight of the disk harrow is supported by the tractor.

4. In a cultivating implement adapted to be pulled by a tractor and raised or lowered by a lift mechanism made part of said tractor; a single steel shape; a series of forwardly and rearwardly extending bearing brackets individually secured to the said steel shape; a disk blade mounted on each said bracket; a rigid hitch connection for connecting the said steel shape to the tractor, whereby the weight of the implement is carried by the tractor.

WILLIAM FREDERICK McMAHON.